US011423620B2

(12) United States Patent
Hutten et al.

(10) Patent No.: US 11,423,620 B2
(45) Date of Patent: Aug. 23, 2022

(54) USE OF SECONDARY SOURCES FOR LOCATION AND BEHAVIOR TRACKING

(71) Applicant: Wormhole Labs, Inc., Huntington Beach, CA (US)

(72) Inventors: Curtis Hutten, Laguna Beach, CA (US); Robert D. Fish, Irvine, CA (US); Brian Kim, Walnut, CA (US)

(73) Assignee: Wormhole Labs, Inc., Sherman Oaks, CA (US)

( * ) Notice: Subject to any disclaimer, the term of this patent is extended or adjusted under 35 U.S.C. 154(b) by 0 days.

(21) Appl. No.: 16/810,822

(22) Filed: Mar. 5, 2020

(65) Prior Publication Data

US 2021/0279962 A1    Sep. 9, 2021

(51) Int. Cl.
| | | |
|---|---|---|
| *G06T 19/00* | (2011.01) | |
| *H04W 4/029* | (2018.01) | |
| *G06T 13/40* | (2011.01) | |
| *G06T 19/20* | (2011.01) | |
| *G06N 5/04* | (2006.01) | |
| *G06N 20/00* | (2019.01) | |

(52) U.S. Cl.
CPC ........... *G06T 19/006* (2013.01); *G06N 5/046* (2013.01); *G06N 20/00* (2019.01); *G06T 13/40* (2013.01); *G06T 19/20* (2013.01); *H04W 4/029* (2018.02)

(58) Field of Classification Search
None
See application file for complete search history.

(56) References Cited

U.S. PATENT DOCUMENTS

| | | | |
|---|---|---|---|
| 7,945,856 B2 * | 5/2011 | Leahy | H04L 67/10 |
| | | | 715/706 |
| 8,504,831 B2 | 8/2013 | Pratt | |
| 8,909,771 B2 | 12/2014 | Heath | |
| 9,303,996 B2 * | 4/2016 | Huang | H04W 4/02 |
| 9,485,206 B2 | 11/2016 | Day, II | |
| 9,679,060 B2 | 6/2017 | Hebenthal | |
| 10,417,613 B1 | 9/2019 | Brisebois et al. | |
| 2007/0273644 A1 * | 11/2007 | Mondine Natucci | |
| | | | H04N 1/00323 |
| | | | 345/156 |
| 2009/0063283 A1 * | 3/2009 | Kusumoto | G06Q 30/0214 |
| | | | 705/14.25 |
| 2010/0037152 A1 | 2/2010 | Bates et al. | |
| 2014/0108361 A1 * | 4/2014 | Biswas | G06F 16/29 |
| | | | 707/693 |

(Continued)

OTHER PUBLICATIONS

International Search Report and Written Opinion for International Application No. PCT/US2021/020680 dated Jun. 25, 2021, 9 pages.

*Primary Examiner* — David H Chu
(74) *Attorney, Agent, or Firm* — Fish IP Law, LLP

(57) ABSTRACT

In a method modifying a user's virtual environment, a tracking module identifies a user identity and determines the location of the user. The tracking module retrieves historical user data associated with the user identity and the user location and identifies one or more patterns of user behavior using an analytical technique based on the historical user data. Upon determining one or more patterns from the data, the tracking module predicts user behavior associated with at least one parameter associated with the location and modifies at least one of a user virtual environment and a user avatar characteristics based on the predicted user behavior.

9 Claims, 7 Drawing Sheets

(56) References Cited

U.S. PATENT DOCUMENTS

| | | | |
|---|---|---|---|
| 2014/0128166 A1* | 5/2014 | Tam | A63F 13/61 463/42 |
| 2014/0245192 A1* | 8/2014 | Chavez | G06F 3/04815 715/757 |
| 2014/0258471 A1* | 9/2014 | Etchegoyen | H04W 4/029 709/219 |
| 2014/0372753 A1* | 12/2014 | DeCristofaro | G06F 21/6245 713/167 |
| 2015/0032766 A1* | 1/2015 | Greenbaum | G06F 16/444 707/756 |
| 2015/0324752 A1* | 11/2015 | Chen | G06Q 10/1095 705/7.19 |
| 2016/0029155 A1* | 1/2016 | Kerr | H04W 4/029 455/456.3 |
| 2016/0299563 A1* | 10/2016 | Stafford | G06F 3/0487 |
| 2016/0300387 A1* | 10/2016 | Ziman | G06F 3/147 |
| 2016/0345132 A1* | 11/2016 | Creighton | G01C 21/3697 |
| 2017/0080346 A1* | 3/2017 | Abbas | A63F 13/79 |
| 2017/0213473 A1* | 7/2017 | Ribeira | G16H 40/67 |
| 2018/0191699 A1* | 7/2018 | Assali | H04W 12/06 |
| 2018/0197347 A1 | 7/2018 | Tomizuka | |
| 2018/0315133 A1 | 11/2018 | Brody et al. | |
| 2018/0348863 A1* | 12/2018 | Aimone | G09G 5/363 |
| 2019/0123927 A1 | 4/2019 | Harris | |
| 2019/0163259 A1* | 5/2019 | Baughman | G06T 13/80 |
| 2019/0187780 A1* | 6/2019 | Hayashida | G06F 3/011 |
| 2019/0208273 A1* | 7/2019 | Johnson | H04N 21/458 |
| 2019/0257913 A1 | 8/2019 | de la Broise et al. | |
| 2019/0295056 A1* | 9/2019 | Wright | H04L 51/046 |
| 2020/0125390 A1* | 4/2020 | Kim | G06N 20/00 |
| 2020/0219319 A1* | 7/2020 | Lashmar | H04L 63/10 |
| 2020/0223352 A1* | 7/2020 | Toshio Kimura | G06N 20/00 |
| 2020/0233681 A1* | 7/2020 | Garstenauer | G06F 3/011 |

\* cited by examiner

USE OF SECONDARY SOURCES FOR LOCATION AND BEHAVIOR TRACKING

FIELD OF THE INVENTION

The field of the invention is enhanced location and behavior tracking.

BACKGROUND

The inventive concepts herein aim to integrate combinations of augmented reality spaces, interactive objects, and virtual reality spaces to dynamically tailor environments based on data collected from secondary data sources.

Specifically, the present invention enables individuals to enter into the augmented reality spaces of others and interact with others, while the environment dynamically changes. For example, the present invention contemplates using social media data of a user to increase the customization of a user's virtual environment to predict and reflect the priorities of a user. In a more specific example, the invention herein can dynamically change a user's avatar appearance, avatar characteristics, and virtual environment characteristics based on the patterns of behavior of a user associated with one or more locations.

To further increase a user's feelings of connectedness to their virtual environment, the augmented realities herein curate spaces that reflect the personal tastes of the subject of the augmented reality space and the objectives of the user in that augmented reality. At a comic book convention, for example, a user may want to themselves and others to see them as super heroes, along with the abilities associated with that super hero. It is contemplated that additional digital goods, capabilities, and/or environmental features can either be implemented for free or purchased using any form of compensation, including legal tender and tokens representing value in a particular technological environment.

Additionally, shared curated spaces can be seen differently for different users. For example, a first user can see a first set digital and real goods on store shelves and a second user can see a second set of digital and real goods on store shelves in a shared augmented reality store front.

U.S. Pat. No. 9,679,060 to Hebenthal teaches social networking enhanced keyword searching to produce more tailored search results. However, Hebenthal fails to contemplate the combination of social network data and other user data to predict the preferences of a user to modify either private or shared augmented realities.

U.S. Pat. No. 8,909,771 to Heath teaches social network-based mapping for analytical purposes. Heath contemplates the use of social media data to provide 2D and/or 3D maps of consumer sentiment towards a brand for marketing purposes. However, Heath similarly fails to contemplate the combination of social network data and other user data to predict the preferences of a user to modify either private or shared augmented realities.

In gaming, it is generally known that players can move between virtual spaces by teleporting. However, these game worlds are largely tied to predetermined structures, limited customization specific to the game, and linked to other preselected areas. For example, a game such as The Sims™ allows users to engage with each other in a shared virtual space with each home built and accessorized using an in-game engine. Unlike The Sims™, the inventive concept herein contemplates a highly customizable mixed reality space that can link to any number of other customized mixed reality spaces. The present invention also contemplates enabling users to tie customizable functions to their mixed reality space, including, but not limited to, functions such as polling, media linking, game linking, linking to other realities, social media functions, and authentication functions.

Hebenthal, Heath, and all other extrinsic materials discussed herein are incorporated by reference to the same extent as if each individual extrinsic material was specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for mixed reality system infrastructures that can customize user augmented realities and avatar characteristics dynamically based on the predicted actions and locations associated with a user.

SUMMARY OF THE INVENTION

The inventive concept herein contemplates virtual reality, augmented reality, and/or mixed reality environments that are highly customizable with various interactive elements. It is contemplated that the interactive elements can be at least partially customized by a tracking module associated with the mixed reality space. It is further contemplated that the tracking module can apply one or more analytical techniques to predict a user's situation and alter a user's environment accordingly.

The present invention contemplates that the tracking module can identify a user identity and determine the location of the user. By retrieving and analyzing the historical user data, the tracking module can identify one or more patterns of user behavior using analytical techniques, such as machine learning algorithms and/or traditional algorithms. Upon determining one or more patterns from the data, the tracking module can predict user behavior and modify at least one of a user virtual environment and a user avatar characteristics based on the predicted user behavior.

Modification to the user's virtual environment are contemplated to include both environmental features as well as the features associated with the user. For example, the user's virtual environment can include both the actual surroundings and the appearance and capabilities of the user's avatar, such as an ability to fly, change color, have a louder or quieter voice, project one or more visual effects, or any other special ability.

Various resources, features, aspects and advantages of the inventive subject matter will become more apparent from the following detailed description of preferred embodiments, along with the accompanying drawing figures in which like numerals represent like components.

DETAILED DESCRIPTION

It should be noted that while the following description is drawn to a computer-based scheduling system, various alternative configurations are also deemed suitable and may employ various computing devices including servers, interfaces, systems, databases, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclose apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including allowing users to access mixed reality environments. Mixed reality environments can include any combination of virtual and augmented reality environments and can be connected to each other in any manner.

For the purposes of this application, sub-environments can comprise any one or more of an augmented reality, a virtual reality, and any other interactive media format. For example, a primary sub-environment can be a first augmented reality, and a secondary sub-environment can be a second augmented reality connected to the first through a portal.

For the purposes of this application, "portal" or any similar terms, such as "portalling" and "portalled" mean any connected between environments. Portals can be in the form of interactive objects, designated spaces, or any other form that allows a user to connect to other augmented realities and/or virtual realities.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
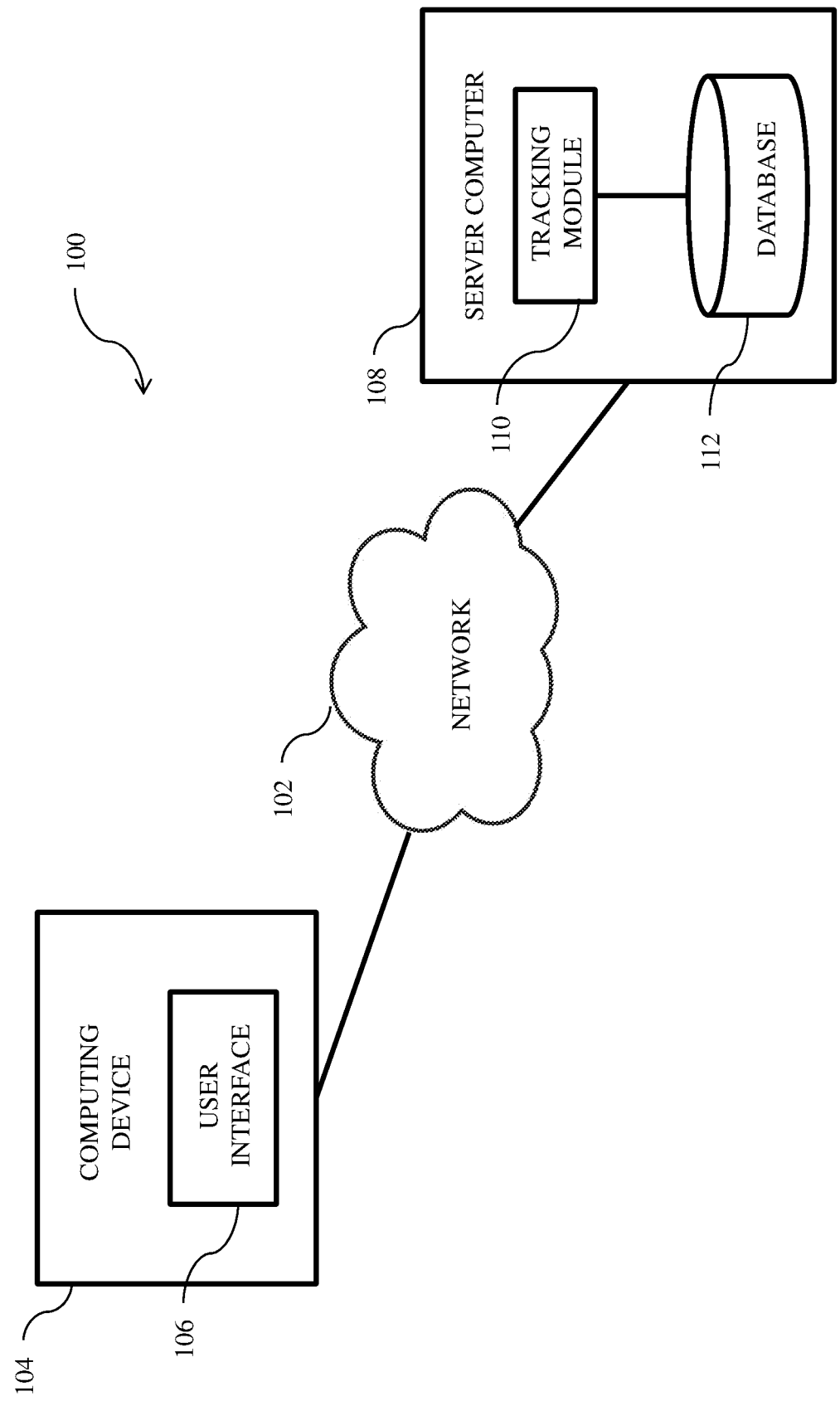
FIG. 1 is a functional block diagram illustrating a distributed data processing environment.

FIG. 1 is a functional block diagram illustrating a distributed data processing environment.

The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 104 and server computer 108, interconnected over network 102. Network 102 can include, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between computing device 104, server computer 108, and any other computing devices (not shown) within distributed data processing environment 100.

It is contemplated that computing device 104 can be any programmable electronic computing device capable of communicating with various components and devices within distributed data processing environment 100, via network 102. It is further contemplated that computing device 104 can execute machine readable program instructions and communicate with any devices capable of communication wirelessly and/or through a wired connection. Computing device 104 includes an instance of user interface 106.

User interface 106 provides a user interface to tracking module 110. Preferably, user interface 106 comprises a graphical user interface (GUI) or a web user interface (WUI) that can display one or more of text, documents, web browser windows, user option, application interfaces, and operational instructions. It is also contemplated that user interface can include information, such as, for example, graphics, texts, and sounds that a program presents to a user and the control sequences that allow a user to control a program.

In some embodiments, user interface can be mobile application software. Mobile application software, or an "app," is a computer program designed to run on smart phones, tablet computers, and any other mobile devices.

User interface 106 can allow a user to register with and configure tracking module 110 (discussed in more detail below) to enable a user to access a mixed reality space. It is contemplated that user interface 106 can allow a user to provide any information to tracking module 110.

Server computer 108 can be a standalone computing device, a management server, a web server, a mobile computing device, or any other computing system capable of receiving, sending, and processing data.

It is contemplated that server computer 108 can include a server computing system that utilizes multiple computers as a server system, such as, for example, a cloud computing system.

In other embodiments, server computer 108 can be a computer system utilizing clustered computers and components that act as a single pool of seamless resources when accessed within distributed data processing environment 100.

Database 112 is a repository for data used by tracking module 110. In the depicted embodiment, tracking module 110 resides on server computer 108. However, database 112 can reside anywhere within a distributed data processing environment provided that tracking module 110 has access to database 112.

Data storage can be implemented with any type of data storage device capable of storing data and configuration files that can be accessed and utilized by server computer 108. Data storage devices can include, but are not limited to, database servers, hard disk drives, flash memory, and any combination thereof.

Figure 2:
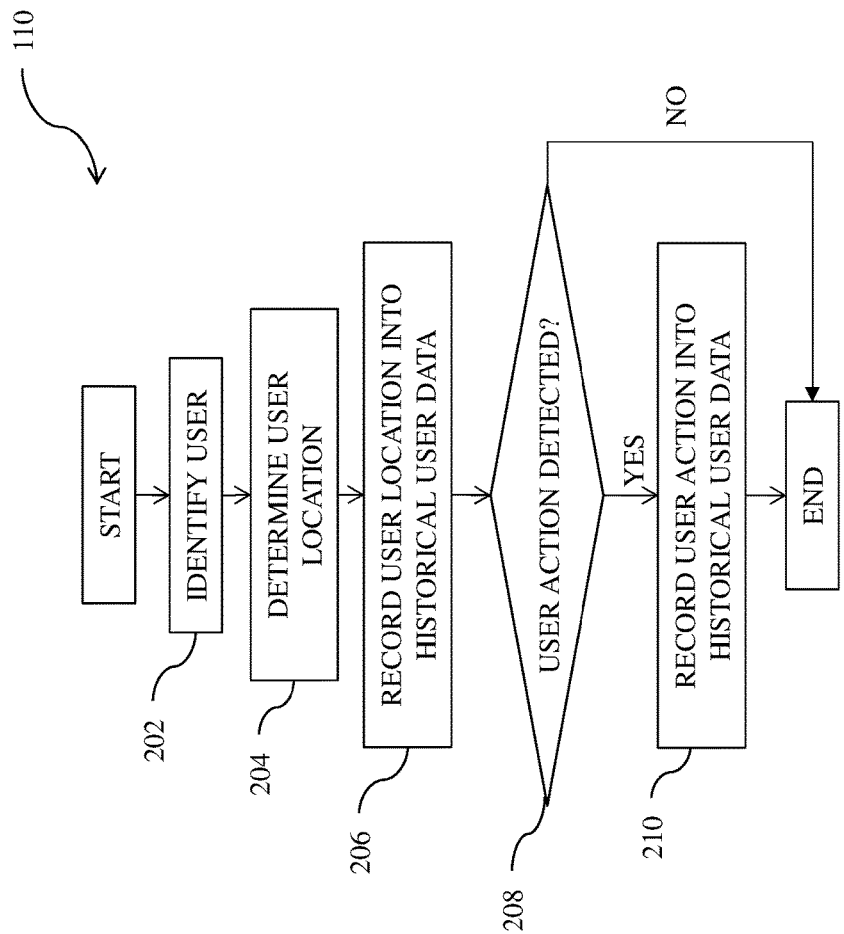
FIG. 2 is a schematic of a method of collecting data user location and actions.

FIG. 2 is a schematic of a method of collecting data user location and actions to compile historical user data.

Tracking module 110 identifies a user (step 202).

Tracking module 110 can identify a user in any manner known in the art. In one embodiment, tracking module 110 identifies a user through a signal sent through computing device 104. For example, tracking module 110 can be tied to software, such as a smart phone app, that can register various user actions, including, but not limited to, purchases, browsing, public posts on social media by the user and/or third-parties, and user subscriptions. It is contemplated that tracking module 110 and any associated software can include various user-controllable parameters to alter how much data is shared with tracking module 110.

In another embodiment, tracking module 110 identifies a user through one or more preselected sources. For example, tracking module 110 can integrate with a social media application, which can receive location information associated with a user when the user makes a social media post through their smartphone.

In another embodiment, tracking module 110 cooperates with one or more hardware functions, such as the accelerometer and a facial recognition camera on a smartphone. In this example, tracking module 110 can identify the user associated with facial recognition software and track the accelerometer to determine whether the user is on the move.

In yet another embodiment, tracking module 110 receives a direct log-in from the user. For example, a user can download an application associated with an augmented reality platform using tracking module 110. When the user logs in and starts using the software, tracking module 110 can directly track one or more types of data associated with the user.

Tracking module 110 determines a user location (step 204).

Tracking module 110 can determine a user location in any manner known in the art.

In one embodiment, tracking module 110 uses hardware to determine the location of a user. For example, tracking module 110 can retrieve information from a global positioning module of a smartphone to determine the location of the user.

In another example, tracking module 110 can triangulate the position of a user based on the user's proximity to one or more cellular towers.

In yet another example, tracking module 110 can determine the proximity of the user to a cluster of other user devices, such as in a music festival where many users are clustered together, to approximate the location of the user.

In another embodiment, tracking module 110 uses software means to determine the location of a user. For example, tracking module 110 can analyze the last social media post of a user to approximate where the user currently is. In a more specific example, tracking module 110 can identify a tag on a social media post of a user indicating the location of the post to be a famous restaurant in the city.

Tracking module 110 records the user location into historical user data (step 206).

Tracking module 110 can record the user location into historical user data in any manner known in the art and using any means known in the art. In a preferred embodiment, tracking module 110 stores historical user data locally in database 112.

In other embodiments, tracking module 110 remotely stores data using a network of remotely connected computers, such as a cloud computing environment. For example, tracking module 110 can store data stored across multiple computers, such as smartphones. In another example, tracking module 110 can send the data through network 102 to be stored in one or more remote servers.

Tracking module 110 determine that a user action has been detected (step 208, "YES" branch).

In one embodiment, tracking module 110 receives a direct signal from a user's phone indicating a user action. For example, tracking module 110 can receive a direct signal from a user's phone associated with the functionality of the phone, such as a GPS signal, a post on social media using the phone, and an search input.

In another embodiment, tracking module 110 determines a user action through indirect sources. For example, tracking module 110 can use natural language processing technology to determine where a picture that the user posted on social media was taken.

In another example, tracking module 110 can use recent search histories and historical user patterns of behavior to determine approximate the user's activities.

In a more specific example, tracking module 110 can determine that a search for a taco truck and use of a route planning surface from the user's school to the taco truck indicates that the user will likely be at the searched taco truck between 30-40 minutes from the time of the search. Additionally, tracking module 110 can determine that a social media post 30-40 minutes contains tacos and a mention of the searched taco truck verifies that the prediction is correct.

Tracking module 110 determine that a user action has not been detected (step 208, "NO" branch). If a user action has not been detected, tracking module 110 ends.

Tracking module 110 records the user action in the historical user data (step 210).

Tracking module 110 can record the user action data in the historical user data in any manner known in the art. In one embodiment, tracking module 110 stores the user action in local storage.

In other embodiments, tracking module 110 stores the user action data remotely. For example, tracking module 110 can store the user action in a remote server through a cloud computing infrastructure.

In yet other embodiments, tracking module 110 stores the user action data using a mixture of local and remote data storage. For example, tracking module 110 can store the user action data in local storage and store a copy of that data on the cloud. In another example, tracking module 110 can store a portion of the user action data locally and another portion of the user action data in a remote server.

Mixed storage options can take advantage of privacy technologies that are tied to the hardware and software of storage devices. For example, highly sensitive user information can be stored in an encrypted local hard drive coupled to the user's smartphone. In another example, highly sensitive user information can be stored in an encrypted remote server with higher levels of data protection than consumer-level hard drives.

Figure 3:
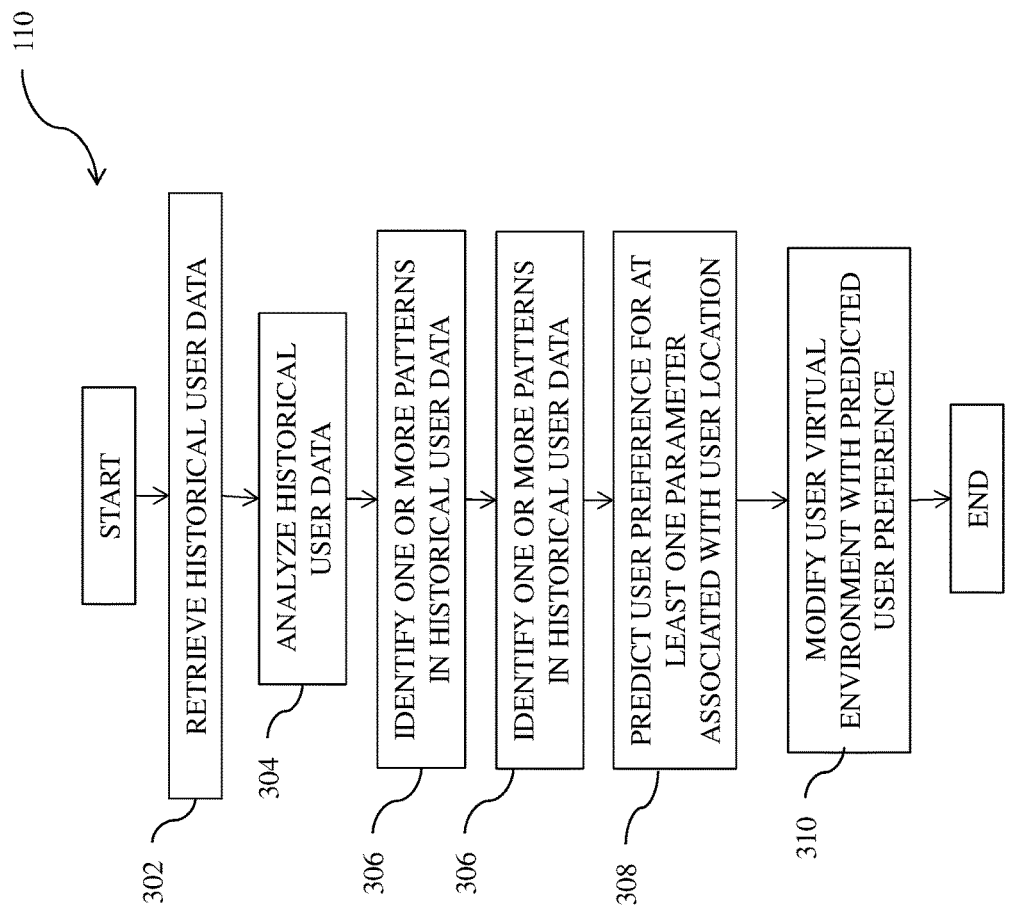
FIG. 3 is a schematic of a method of modifying a digital environment about a subject using predictive analytics.

FIG. 3 is a schematic of a method of modifying a digital environment about a subject using predictive analytics.

Tracking module 110 retrieves the historical user data (step 302).

Historical user data can include any information associated with the user and the user's activities. For example, sources of user information can include, but are not limited to, social media posts, location data, purchase histories, and browsing histories.

In some embodiments, historical user data is compiled by data directly received and recorded by tracking module 110. For example, historical user data can be compiled and used solely for the purposes of the compiling organization, such as an augmented reality technology company, to better control the privacy of its users.

In another embodiment, historical user data can be compiled from a variety of sources, such as a data acquired from third parties, and applied to a particular platform. For example, tracking module 110 can purchase data from gaming companies, food companies, and retailers to determine which advertisements to show attendees of a gaming convention for a particular fighting game. In another example, tracking module 110 can purchase user data from a search engine to determine which advertisements to display in a particular geographic location based on the most common searches for consumer goods by people living in that area.

Tracking module 110 analyzes historical user data (step 304).

Tracking module 110 can analyze historical user data in any manner known in the art. In one embodiment, tracking module 110 can analyze historical user data only using traditional algorithms. For example, tracking module 110 can analyze the percentage of total play time dedicated to a particular game character to determine which virtual goods to offer a user in an advertisement in the user's augmented reality interface.

In another embodiment, tracking module 110 can analyze historical user data user machine learning algorithms, which include, but are not limited to, supervised learning classifiers, time-series analysis, and linear regression analysis.

Tracking module 110 identifies one or more patterns in the historical user data (step 306).

In some embodiments, one or more machine learning techniques are used to identify user patterns in the historical data. For example, a time series classifier can be used to predict a user's relaxed mood based on a location and the activities typically associated with the user during the time of day in the location.

In another example, a linear regression analysis can be used to predict what a user will do next (e.g., play a particular video game or talk about a particular topic) and tailor the characteristics of an avatar associate with the user to those reflect those predictions. In a more specific example, tracking engine 110 can determine that the user is likely to head to a comic book store to play board games after eating at a particular restaurant in a specific geographic location. In another example, tracking engine 110 can display a suggestion to schedule a gaming meetup with a user's friend based on the proximity of the user's friend's location to the board game night that the user is predicted to attend.

In yet another example, a supervised learning classifier can be used to identify common objects in the space around a user in the user's location, such as a French bakery, and render user-specific augmented reality advertisements for other French goods when the user is within three miles of that location.

In another example, a supervised learning classifier can be used to identify pictures of friends that commonly play with the user in a particular video game. Based on the identified pictures, tracking module 110 can modify the virtual reality about a user to include pictures and additional functionalities, such as a quick-dial list with the identified friends' contact details in an augmented reality interface.

Tracking module 110 predicts user preferences for at least one parameter associated with the user location (step 308).

Tracking module 110 can make any predictions from one or more parameters. For example, tracking module 110 can predict the type of clothing that a user is interested in when they arrive at a particular location based on a history of social media posts about a particular brand. By determining that the user location is adjacent to a storefront of the brand and determining that the brand has just released a new line of seasonal clothing, tracking module 110 can predict which of the newly released items will be the most likely purchases of the user.

Tracking module 110 modifies a user virtual environment with the predicted user preference (step 310).

Tracking module 110 can change any characteristic of the user environment based on predicted user preference. For example, if tracking module 110 predicts that a user will most likely purchase jeans and jackets at a particular retailer, the augmented reality representation of the store through the user's smartphone can dynamically rearrange the store displays to depict jeans and jackets in augmented reality. In a related example, if tracking module 110 predicts that a user responds most positively to the color blue, the user's virtual environment can be changed to a bluer color scheme.

In yet another example, if tracking module 110 predicts that the user will be arriving at a particular location to play a fantasy-style board game, then tracking module 110 can render more and more fantasy elements in the user's virtual environment until the user arrives at the location, which can be shown as a virtual castle in augmented reality rather than a friend's house.

A virtual environment can include virtual elements and augmented reality elements. Augmented reality elements are derived from physical spaces in the real world. In preferred embodiments, the virtual environment comprises both virtual elements and augmented reality elements presented in the virtual environment. For example, the virtual environment can be a three-dimensional representation of the Earth where augmented reality elements are distributed within the three-dimensional representation of the Earth. In a more specific example, the augmented reality elements can be tied to specific individuals and contain representations of the individuals' real-world environments by any means known in the art, including 360° cameras, conventional video cameras, and stitched photos from cameras.

User virtual environments can include, but are not limited to, virtual reality, augmented reality, and any other mixed reality medium. In some embodiments, user virtual embodiments can be shared realities with any combination of sub-environments. Sub-environments can also include, but are not limited to, virtual reality, augmented reality, and any other mixed reality mediums.

Figure 4:
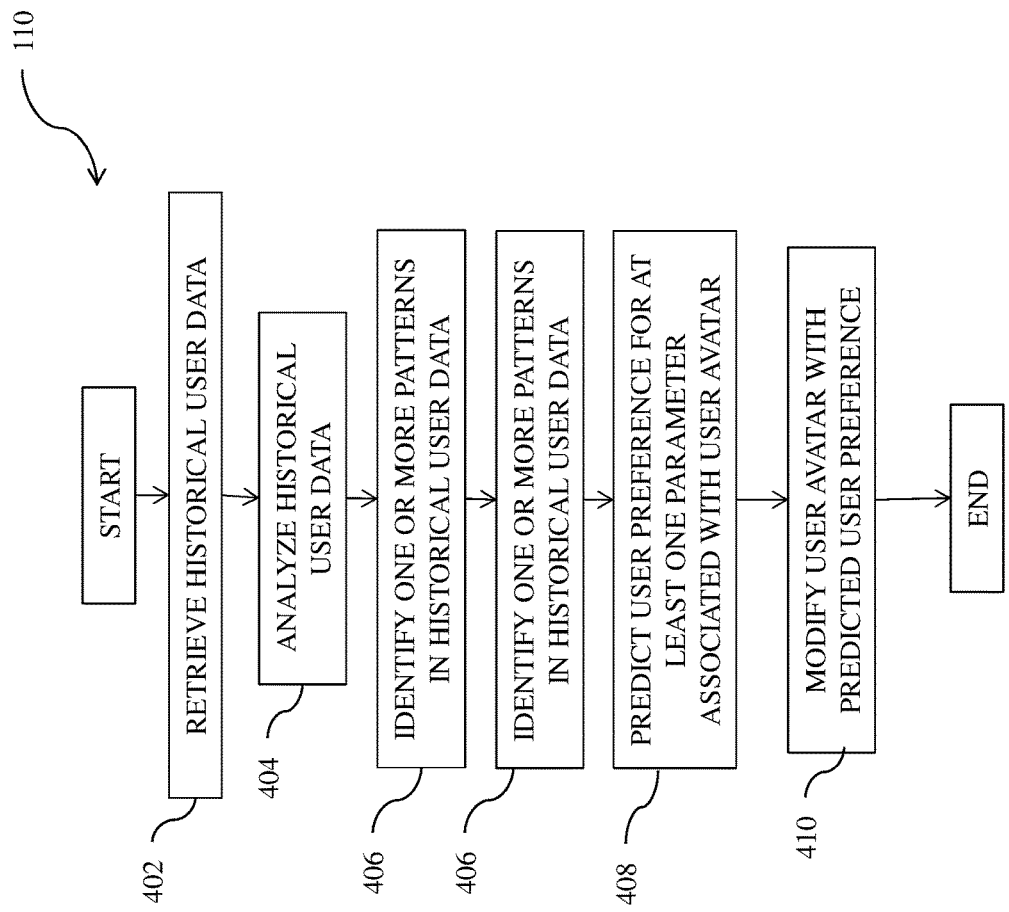
FIG. 4 is a schematic of a method of modifying the characteristics of an avatar associated with a user using predictive analytics.

FIG. 4 is a schematic of a method of modifying the characteristics of an avatar associated with a user using predictive analytics.

Tracking module 110 retrieves the historical user data (step 402).

Historical user data can include any information associated with the user and the user's activities. For example, sources of user information can include, but are not limited to, social media posts, location data, purchase histories, and browsing histories.

In some embodiments, historical user data is compiled by data directly received and recorded by tracking module 110.

For example, historical user data can be compiled and used solely for the purposes of the compiling organization, such as an augmented reality technology company, to better control the privacy of its users.

In another embodiment, historical user data can be compiled from a variety of sources, such as a data acquired from third parties, and applied to a platform. For example, tracking module 110 can purchase data from gaming companies, food companies, and retailers to determine which advertisements to show attendees of a gaming convention for a fighting game. In another example, tracking module 110 can purchase user data from a search engine to determine which advertisements to display in a geographic location based on the most common searches for consumer goods by people living in that area.

Tracking module 110 analyzes historical user data (step 404).

Tracking module 110 can analyze historical user data in any manner known in the art. In one embodiment, tracking module 110 can analyze historical user data only using traditional algorithms. For example, tracking module 110 can analyze the percentage of total play time dedicated to a particular game character to determine which virtual goods to offer a user in an advertisement in the user's augmented reality interface.

In another embodiment, tracking module 110 can analyze historical user data user machine learning algorithms, which include, but are not limited to, supervised learning classifiers, time-series analysis, and linear regression analysis.

Tracking module 110 identifies one or more patterns in the historical user data (step 406).

In some embodiments, one or more machine learning techniques are used to identify user patterns in the historical data. For example, a time series classifier can be used to predict a user's relaxed mood based on a location and the activities typically associated with the user during the time of day in the location.

In another example, a linear regression analysis can be used to predict what a user will do next (e.g., play a specific video game or talk about a particular topic) and tailor an augmented reality environment around the user to those reflect those prediction. In a more specific example, tracking engine 110 can display a suggestion to head to local sale for a fashion boutique in a user's augmented reality interface based on the user's location. In another example, tracking engine 110 can display a suggestion to schedule a meetup with a user's friend based on the proximity of the user's friend's location to the predicted next location of the user based on the current activity of the user.

In yet another example, a supervised learning classifier can be used to identify common objects in the space around a user in the user's location, such as a French bakery, and render user-specific augmented reality advertisements for other French goods when the user is within three miles of that location.

In another example, a supervised learning classifier can be used to identify pictures of friends that commonly play with the user in a particular video game. Based on the identified pictures, tracking module 110 can modify the virtual reality about a user to include pictures and additional functionalities, such as a quick-dial list with the identified friends' contact details in an augmented reality interface.

Tracking module 110 predicts user preferences for at least one parameter associated with a user avatar (step 408).

Tracking module 110 modifies a user avatar with the predicted user preference (step 410).

Modification of the user avatar can be based on any parameter or combination of parameters. For example, modification of the user avatar can be based on a mixture of location, historical user shopping data, social media data, and any other identifiable parameter.

Tracking module 110 can change any characteristic of the user avatar based on predicted user preference. For example, if tracking module 110 predicts that a user will most likely purchase jeans and jackets at a particular retailer, the augmented reality representation of the user can automatically "wear" clothing from the new line to show how it might look in real life. In a related example, if tracking module 110 predicts that a user responds most positively to the color blue, the user's appearance can prioritize a blue color scheme.

In yet another example, if tracking module 110 predicts that the user will be arriving at a particular location to play a fantasy-style board game, then tracking module 110 can render a suit of knight's armor as part of the user's avatar when the user arrives at the location.

In yet another example, tracking module 110 can predict that a user will want to be a portrayed as a pirate and can render the avatar of the user as a pirate with a modified pirate voice. In a related embodiment, tracking module 110 can associate additional visual and audio effects with the user. For example, tracking module 110 can render a parrot that responds to real-time conversations between the user and other avatar by saying or repeating phrases. In another example, tracking module 110 can render the floor around the user as the wooden planks of a boat and render the area further away from the avatar of the user as open waters, such that other users in the shared augmented reality space perceive the same environment within a particular physical distance of the user. It is contemplated that tracking module 110 can divide mixed reality environment into any interconnected and/or nested virtual reality environments.

Figure 5:
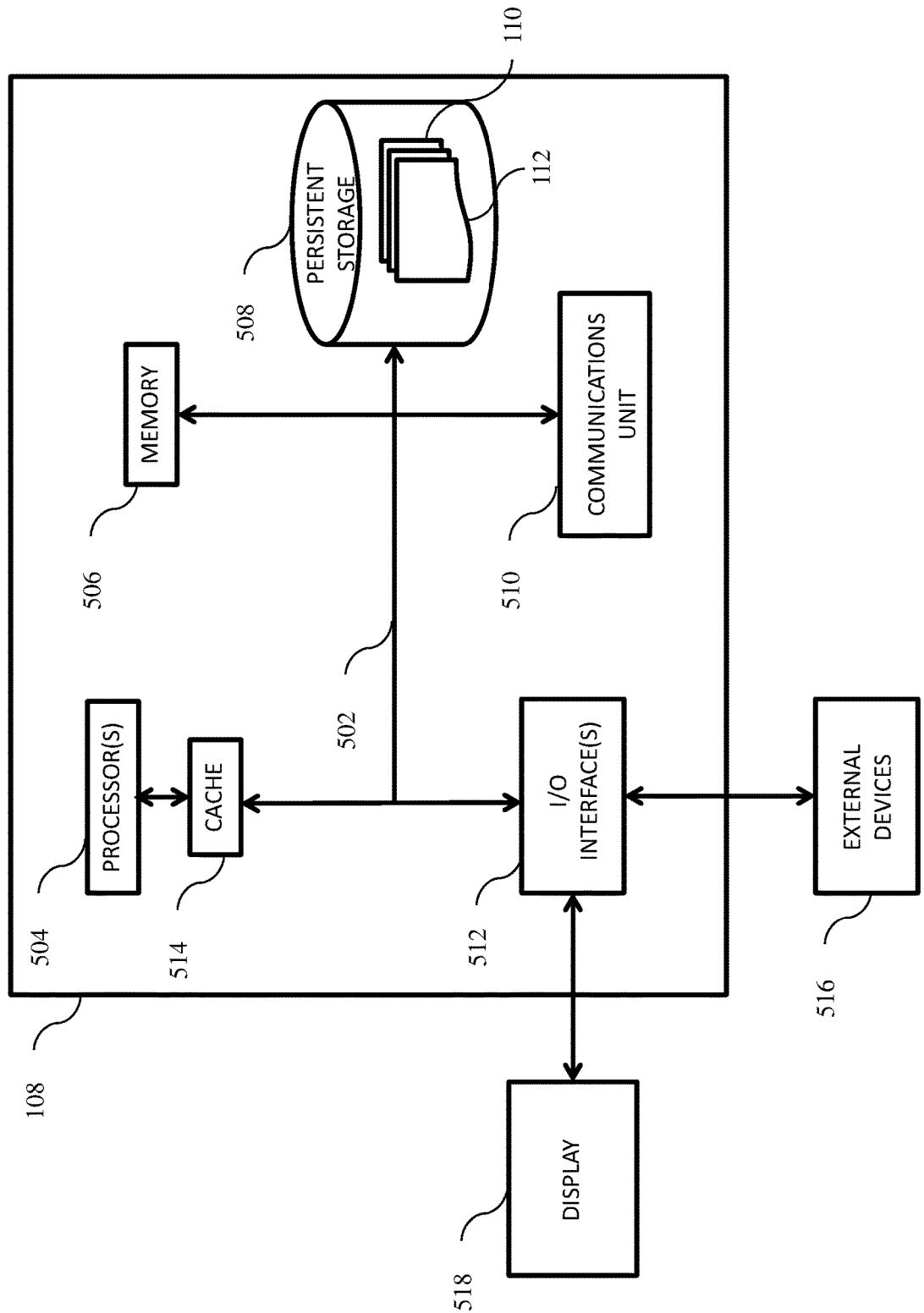
FIG. 5 depicts a block diagram of components of the server computer executing the mixed reality engine within the distributed data processing environment of FIG. 1.

FIG. 5 depicts a block diagram of components of the server computer executing the tracking engine 110 within the distributed data processing environment of FIG. 1. FIG. 5 is not limited to the depicted embodiment. Any modification known in the art can be made to the depicted embodiment.

In one embodiment, the computer includes processor(s) 504, cache 514, memory 506, persistent storage 508, communications unit 510, input/output (I/O) interface(s) 512, and communications fabric 502.

Communications fabric 502 provides a communication medium between cache 514, memory 506, persistent storage 508, communications unit 510, and I/O interface 512. Communications fabric 502 can include any means of moving data and/or control information between computer processors, system memory, peripheral devices, and any other hardware components.

Memory 506 and persistent storage 508 are computer readable storage media. As depicted, memory 506 can include any volatile or non-volatile computer storage media. For example, volatile memory can include dynamic random-access memory and/or static random access memory. In another example, non-volatile memory can include hard disk drives, solid state drives, semiconductor storage devices, a read-only memory (ROM), an erasable programmable read-only memory (EPROM), a flash memory, and any other storage medium that does not require a constant source of power to retain data.

In one embodiment, memory 506 and persistent storage 508 are random access memory and a hard drive hardwired to computing device 504, respectively. For example, computing device 504 can be a computer executing the program instructions of tracking module 110 communicatively coupled to a solid-state drive and DRAM.

In some embodiments, persistent storage 508 is removable. For example, persistent storage 508 can be a thumb drive or a card with embedded integrated circuits.

Communications unit 510 provides a medium for communicating with other data processing systems or devices, including data resources used by computing device 104. For example, communications unit 510 can comprise multiple network interface cards. In another example, communications unit 510 can comprise physical and/or wireless communication links.

It is contemplated that tracking module 110, database 112, and any other programs can be downloaded to persistent storage 508 using communications unit 510.

In a preferred embodiment, communications unit 510 comprises a global positioning satellite (GPS) device, a cellular data network communications device, and short to intermediate distance communications device (e.g., Bluetooth®, near-field communications, etc.). It is contemplated that communications unit 510 allows computing device 104 to communicate with other computing devices 104 associated with other users.

Display 518 is contemplated to provide a mechanism to display information from tracking module 110 through computing device 104. In preferred embodiments, display 518 can have additional functionalities. For example, display 518 can be a pressure-based touch screen or a capacitive touch screen.

In yet other embodiments, display 518 can be any combination of sensory output devices, such as, for example, a speaker that communicates information to a user and/or a vibration/haptic feedback mechanism. For example, display 518 can be a combination of a touchscreen in the dashboard of a car, a voice command-based communication system, and a vibrating bracelet worn by a user to communicate information through a series of vibrations.

It is contemplated that display 518 does not need to be physically hardwired components and can, instead, be a collection of different devices that cooperatively communicate information to a user.

Figure 6A:
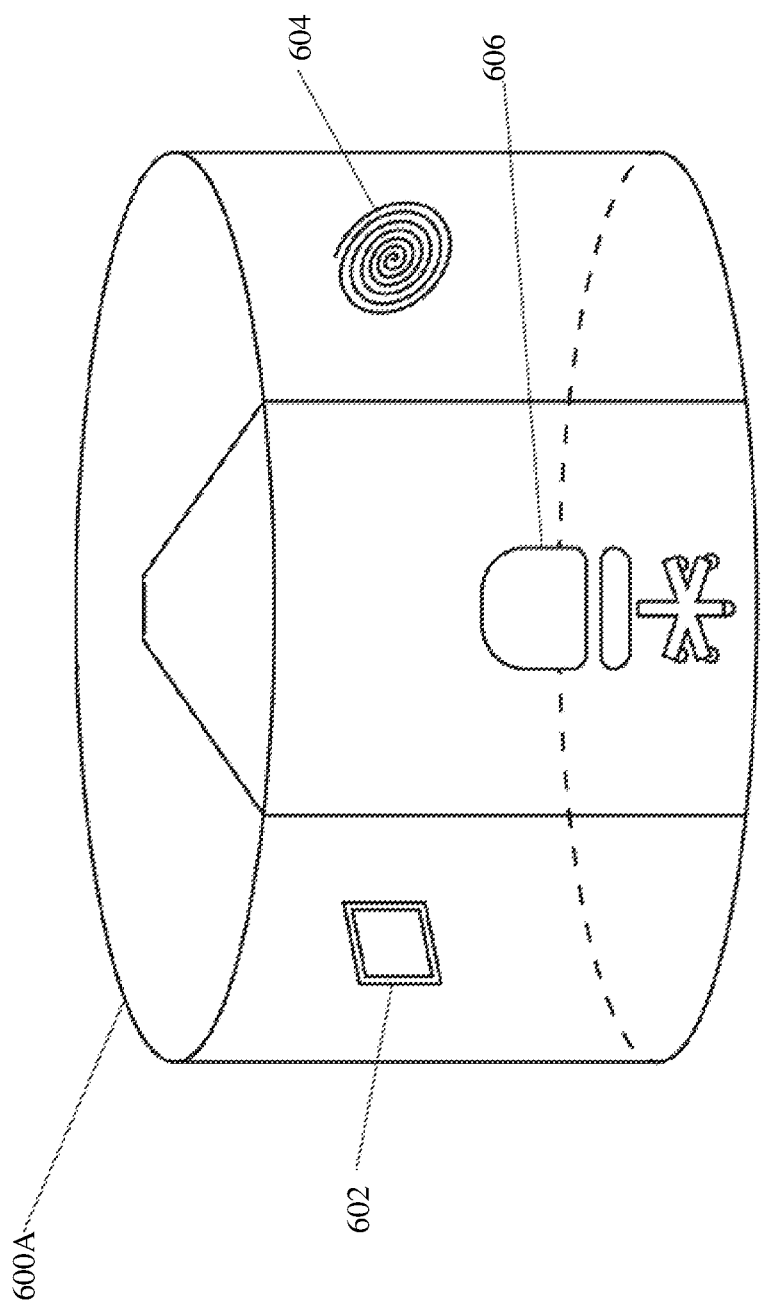
FIG. 6A depicts a first augmented reality environment about a subject.

FIG. 6A depicts a first augmented reality environment about a subject.

Environment 600A includes a default augmented reality environment with a chair in the middle representing user position 606. Environment 600A further includes a real world object 602 and an augmented reality object 604.

It is contemplated that any objects, including any combination of real-world objects and virtual objects, can comprise environment 600A.

Figure 6B:
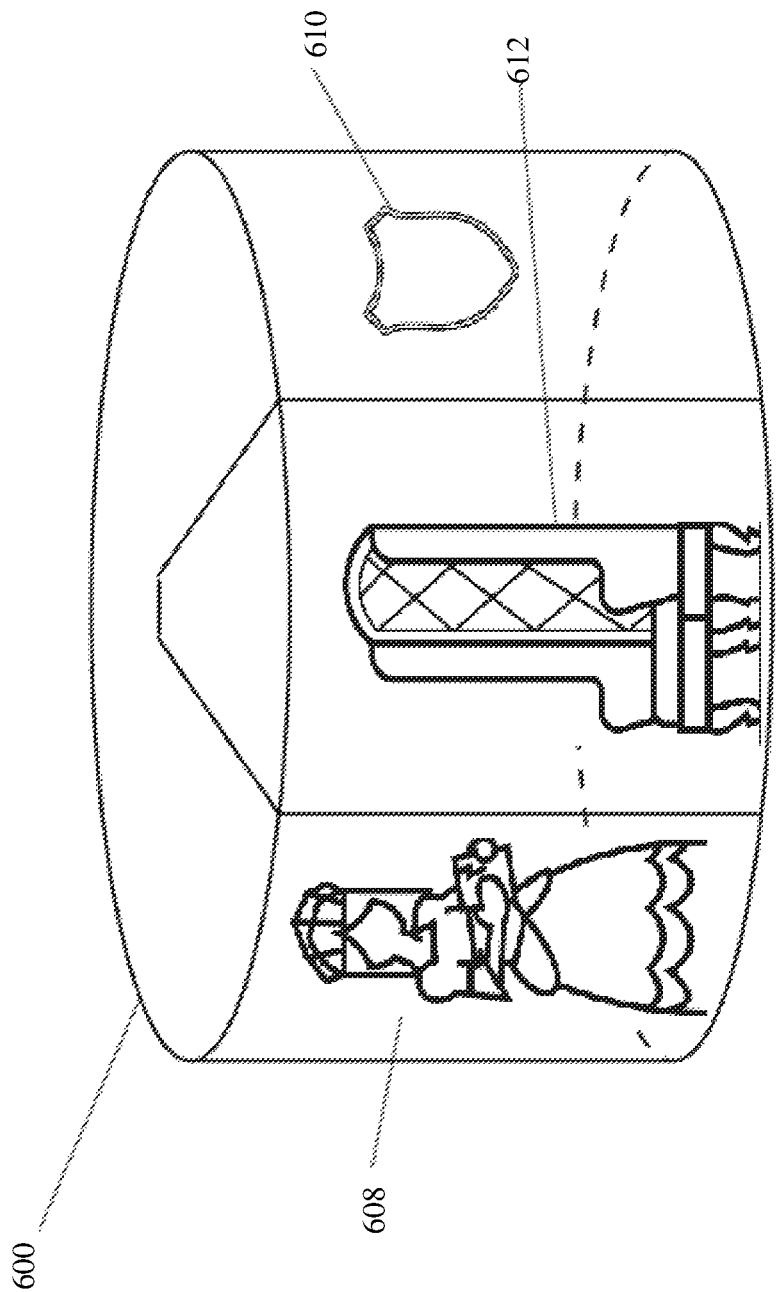
FIG. 6B depicts a modified augmented reality environment about a subject.

FIG. 6B depicts a modified augmented reality environment about a subject.

Environment 600B depicts a modified augmented reality environment based on the prediction associated with a user. For example, the chair at representing user position 606 can be replaced with a king's throne 612 for a location where the user visits to play fantasy board games with friends. Real-world object 602 can include a representation of a princess (e.g., using a symbol (e.g. QR code) or a picture of an actual princess that tracking module 110 registers as a princess avatar) that is virtually represented as a three dimension render of a princess. Augmented reality object 604 which is represented as a wormhole to another world can be changed into a medieval family crest that functions as a portal to a virtual world associated with the board game.

It is contemplated that any functionality and appearance can be modified of either a user's environment or the user's avatar. For example, the user's avatar can be changed into a superhero when they arrive at a comic book convention, and the superpowers of the superhero can be applied to the user's avatar, thereby allowing the user to fly, shoot virtual laser beams, and produce virtual fire from the avatar's hands.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. The characteristics are as follows: on-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a high level of abstraction (e.g., country, state, or data center). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of selected networking components (e.g., host firewalls).

Deployment Models are as follows: Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of using one or more computer processors to modify a virtual environment about a user, comprising:
    determining a user identity;
    determining a location of the user;
    retrieving historical user data associated with the user identity and the user location;
    identifying one or more patterns of user behavior using an analytical technique based on the historical user data;
    predicting a user behavior associated with at least one parameter associated with the location;
    modifying at least one of a user virtual environment and a user avatar characteristic based on the predicted user behavior, wherein modifying the user virtual environment comprises modifying avatar functionality in the user virtual environment and wherein the avatar functionality is selected from the group consisting of: social media functions, commerce-based functions, environment customization tools, and access to a restricted virtual space;
    determining one or more suggested user actions to the user based on the predicted user behavior and a social network of the user; and
    sending the one or more suggested user actions to the user.

2. The method of claim 1, wherein the analytical technique comprises a traditional algorithm.

3. The method of claim 1, wherein the analytical technique comprises a machine learning algorithm.

4. The method of claim 3, wherein the machine learning algorithm is selected from a group consisting of: a linear regression algorithm, a supervised learning classifier, and a time-series analysis.

5. The method of claim 1, wherein the user virtual environment comprises a shared virtual environment comprising multiple users.

6. The method of claim 1, wherein the user avatar characteristics comprise at least one of an avatar appearance and an avatar action.

7. The method of claim 1, further comprising storing the user identity and the location of the user in the historical user data.

8. The method of claim 1, wherein the historical user data is limited to user data approved for collection by the user.

9. The method of claim 1, wherein the historical user data is compiled from third-party data sources.

* * * * *